United States Patent [19]

Teel et al.

[11] Patent Number: 4,727,760

[45] Date of Patent: Mar. 1, 1988

[54] CONNECTION BETWEEN THE EQUALIZER BEAM AND THE WALKING BEAM OF A WALKING BEAM TYPE OIL WELL PUMPING UNIT

[75] Inventors: Larry W. Teel; Donald L. Bailey, both of Yukon; Brian K. Davis, Stillwater, all of Okla.

[73] Assignee: Baker International Corporation, Houston, Tex.

[21] Appl. No.: 909,199

[22] Filed: Sep. 19, 1986

[51] Int. Cl.[4] .................... F04B 47/02; F16D 1/00
[52] U.S. Cl. .................................. 74/41; 403/152; 403/316
[58] Field of Search ............ 74/41, 108, 581, 589-592; 403/150, 152, 154, 315, 316

[56] References Cited

U.S. PATENT DOCUMENTS

| | | | |
|---|---|---|---|
| 1,058,987 | 4/1913 | Labudde | 403/152 |
| 1,396,435 | 11/1921 | Jackson | 403/152 |
| 2,515,360 | 7/1950 | Vail | 74/581 |
| 2,522,625 | 9/1950 | Lundgren | 403/152 |
| 3,005,353 | 10/1961 | Gallaway | 74/41 |
| 3,183,728 | 5/1965 | Ramsdell | 74/41 |
| 3,999,873 | 12/1976 | Green et al. | 403/315 |
| 4,377,092 | 3/1983 | Garmong | 74/41 |

FOREIGN PATENT DOCUMENTS 1344915 10/1963 France .................. 403/316

*Primary Examiner*—Lawrence J. Staab
*Attorney, Agent, or Firm*—Senniger, Powers, Leavitt and Roedel

[57] ABSTRACT

The invention is directed to a connection between the equalizer beam and the walking beam in a walking beam type oil well pumping unit, the walking beam having a tail shaft rotatably mounted generally perpendicular to the longitudinal axis of the beam. The connection comprises an equalizer beam and two support members spaced from one another lengthwise of the equalizer beam and rigidly secured to the beam, each support member having an arm extending outwardly toward the other support member, and each arm having a curved downwardly-facing bearing surfaces adapted to be engaged by a respective end of the tail shaft. A retainer associated with each support member holds its respective end of the tail shaft in engagement with the downwardly-facing bearing surface when forces tending to separate the shaft from the bearing surface are applied to the shaft.

24 Claims, 5 Drawing Figures

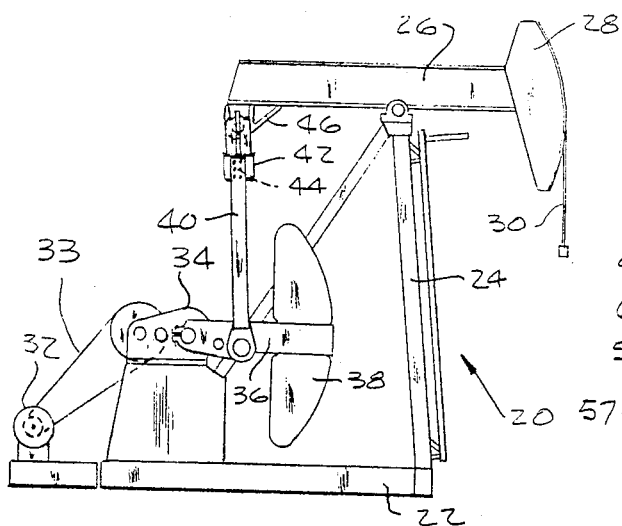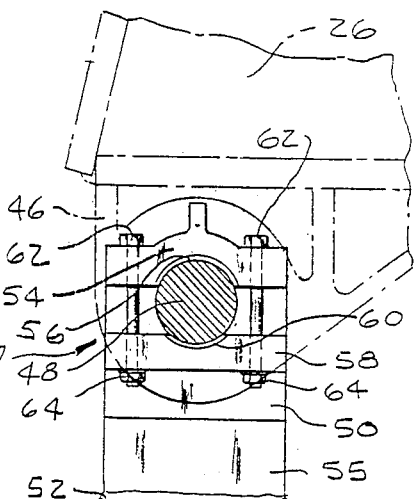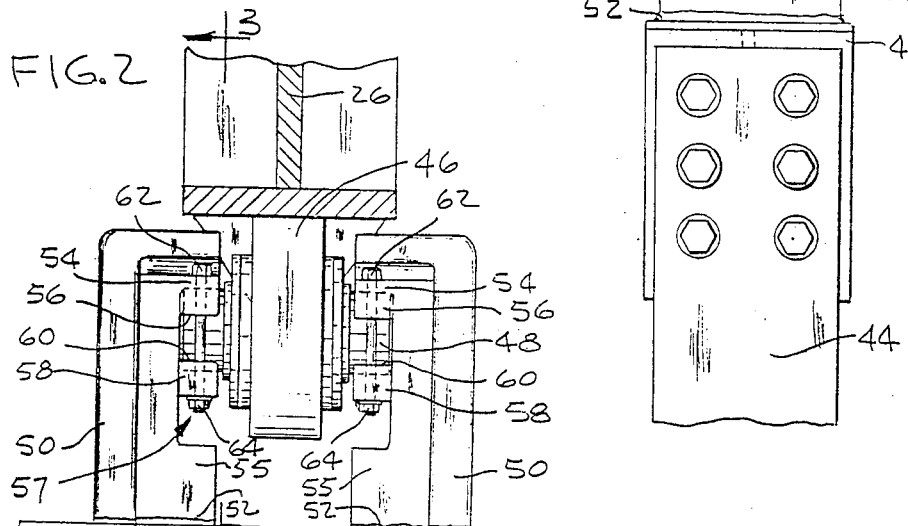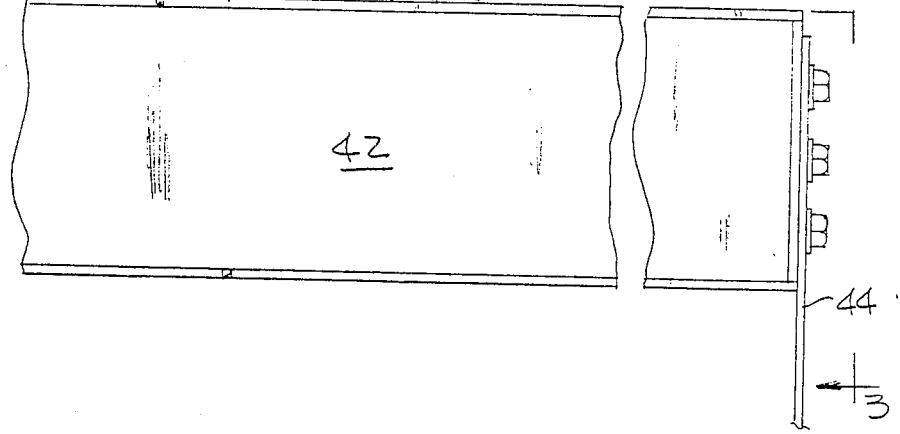

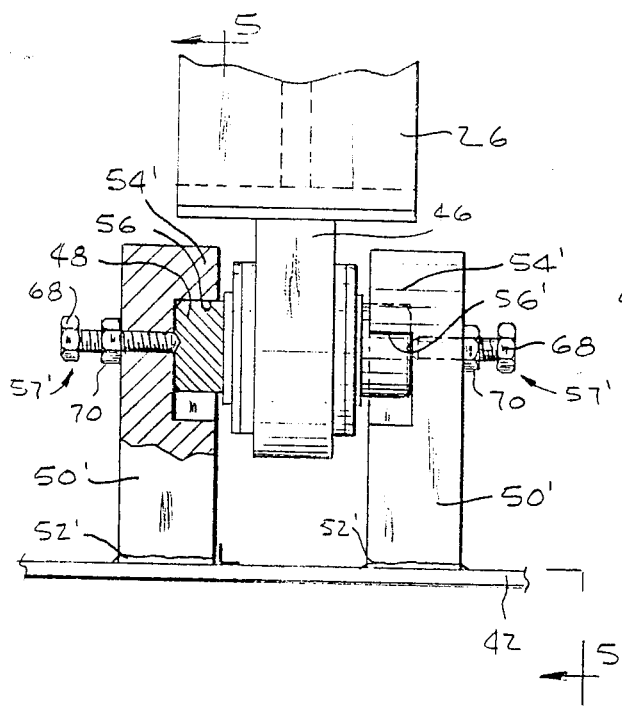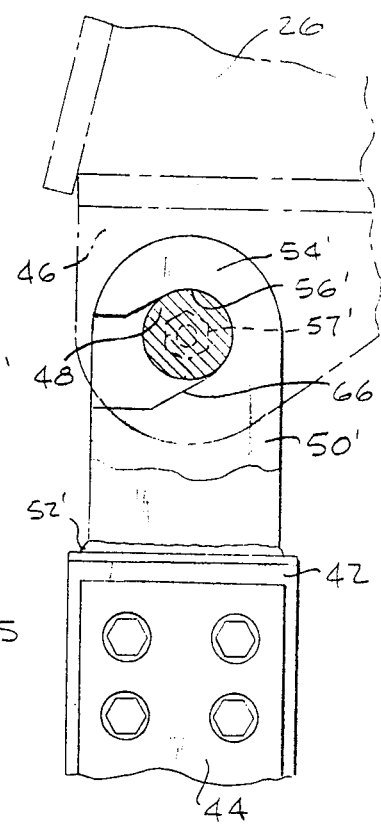

CONNECTION BETWEEN THE EQUALIZER BEAM AND THE WALKING BEAM OF A WALKING BEAM TYPE OIL WELL PUMPING UNIT

BACKGROUND OF THE INVENTION

This invention relates generally to a walking beam type oil well pumping unit, and in particular to an improved means for connecting the walking beam and equalizer beam of such a unit.

In a typical walking beam type oil well pumping unit, a walking beam is pivoted at the upper end of a samson post and has a horse head at its front end which supports a polished rod that reciprocates in the well opening. The walking beam is rocked on the samson post by a motor which rotates two counterweighted cranks in vertical planes parallel to that of the walking beam. The lower end of a pitman arm is pivotally connected to each crank. The upper ends of the two pitman arms are connected to opposite ends of an equalizer beam, the latter being connected to the rear end of the walking beam so that the motion of the cranks is transferred through the pitman arms and equalizer beam to the walking beam.

The walking beam is typically connected to the equalizer beam by means of a tail shaft rotatably mounted on the walking beam perpendicular to the axis of the walking beam and parallel to the axis of the equalizer beam. The tail shaft is journaled in a bearing supported by a bracket depending from the rear end of the walking beam. In one design, the ends of the tail shaft are held in split mounts secured to the equalizer beam. Each mount comprises a base with a semicylindrical groove and a cap with a complementary semicylindrical groove which together form a cylindrical opening for receiving a respective end of the tail shaft. The cap and base are bolted to the equalizer beam. Due to the design of the pump unit, the bolts are under a cyclical tensile load; and if they are not properly torqued when they are installed, the cyclic loading may cause premature fatigue failure. The installation in the field thus requires skill and care and is time consuming. Even when the bolt is properly installed, it is still prone to fatigue failure.

In another prior system, the tail shaft is rotatable in a bearing housing with its ends held in a pair of pinch blocks welded to the equalizer beam, the size of the shaft openings in the pinch blocks being adjustable by bolts. The bearing housing includes a sleeve perpendicular to the tail shaft, by which the housing can be mounted to the walking beam with a pin. This system requires very precise manufacture to insure proper alignment of the components when assembled. The pinch block bolts are also subject to cyclic loading.

SUMMARY OF THE INVENTION

Among the several objects of this invention may be noted the provision of a tail shaft support for an equalizer beam which is of simple and inexpensive construction, and which can be substantially preassembled to eliminate difficult assembly steps in the field; the provision of such a tail shaft support which is less subject to cyclic fatigue; and the provision of such a tail shaft support which is easy to assemble and maintain in the field and which supports the load in a simple and direct fashion.

Generally, the tail shaft support of this invention for an oil well pumping unit comprises an equalizer beam and a pair of support members spaced from one another lengthwise of the equalizer beam and rigidly secured to the beam, each support member having an integral arm extending laterally outwardly from the support member toward the other support member generally parallel to the equalizer beam and spaced above the beam. The arms have curved generally downwardly-facing bearing surfaces adapted for rotatable engagement by respective ends of said tail shaft. Retainer means is associated with each support member for holding a respective end of the tail shaft in engagement with said downwardly-facing bearing surface when forces tending to separate the shaft from the bearing surface are applied to the shaft.

These and other advantages will become apparent with reference to the preferred embodiments described below.

BRIEF DESCRIPTION OF THE DRAWINGS

FIG. 1 is a side elevation view of a typical walking beam type oil well pumping unit incorporating a tail shaft support of this invention;

FIG. 2 is a partial rear elevational view of the pumping unit showing a tail shaft mounted on the walking beam with its ends journaled in a pair of support members mounted on the equalizer beam;

FIG. 3 is a cross-sectional view taken along line 3—3 in FIG. 2 showing the inner side of a support member;

FIG. 4 is a partial elevation view of the pumping unit showing a second embodiment of tail shaft support members mounted on the equalizer beam; and FIG. 5 is a cross-sectional view taken along line 5—5 in FIG. 4 showing the inner side of a support member.

Corresponding reference characters indicate corresponding parts throughout the drawings.

DETAILED DESCRIPTION OF THE PREFERRED EMBODIMENT

A typical walking beam type oil well pumping unit is indicated generally as 20 in FIG. 1. Pumping unit 20 comprises a base 22, a samson post 24 extending upwardly from the base, and a walking beam 26 pivoted on the samson post 24. A horse head 28 at the front end of walking beam 26 supports a cable 30 that holds the polished rods (not shown) which reciprocate in the well opening.

The walking beam 26 is rocked by a motor 32 through V-belts 33 which drives a reduction gearbox 34 to turn two cranks 36 provided with counterweights 38. A pitman arm 40 is pivotally mounted at its lower end to each crank 36. The upper ends of the pitman arms 40 are suitably connected to opposite ends of an equalizer beam 42, as by leaf springs 44 (see FIGS. 2 and 3).

The walking beam has a bearing housing 46 depending from its rearward end. A tail shaft 48 is rotatably mounted in bearings (not shown) in housing 46, with the ends of tail shaft 48 projecting out from the housing. As will appear, the ends of tail shaft 48 are connected to the equalizer beam 42 so that motion of cranks 36 is transmitted via pitman arms 40 and equalizer beam 42 to walking beam 26. The leaf springs 44 accommodate any slight misalignments between the members. According to the principles of this invention, the ends of the tail shaft 48 are held by two opposing support members 50 mounted on the equalizer beam 42.

In the first embodiment of the invention shown in FIGS. 2 and 3, two support members 50 spaced from each other lengthwise of the equalizer beam 42 are rigidly secured to the equalizer beam, as by welds 52. Each support member 50 has an integral arm 54 extending laterally outwardly toward the other support member, generally parallel to equalizer beam 42 but spaced above it. As best shown in FIG. 2, each support block 50 has an enlarged base 55 which facilitates securing the support block to the equalizer beam and which gives the support block a generally C-shaped configuration. Each arm 54 has a curved generally downwardly-facing bearing surface 56 adapted for engagement by a respective end of the tail shaft 48. The bearing surface 56 preferably is of continuous, one piece construction. This bearing surface 56 is curved on an arc of from about 60° to about 180°, and preferably about 105°.

Because of the construction of pumping unit 20, the ends of the tail shaft 48 should constantly bear up against their respective bearing surfaces 56. However, a retainer means generally indicated at 57 is associated with each support member 50 for holding a respective end of the tail shaft in engagement with its respective bearing surface 56 when forces tending to separate tail shaft 48 from bearing surface 56 are applied to the shaft.

In the first embodiment, retainer means 57 comprises a retainer member or bar 58 adapted to be positioned below each end of tail shaft 48. The retainer bar has a curved upwardly-facing bearing surface 60 adapted for engagement by a respective end of the tail shaft 48. This bearing surface 60 is curved on an arc from about 60° to 180°, and preferably about 90°. Fastener means, such as bolts 62 and nuts 64, draw the retainer bar 58 up against a respective end of the tail shaft to thereby clamp the tail shaft between the upwardly and downwardly facing bearing surfaces 56 and 60.

In a second embodiment shown in FIGS. 4 and 5, two support members 50' are spaced from each other lengthwise of equalizer beam 42 and are rigidly secured to the beam, as by welds 52'. Each support member 50' has an integral arm or arm portion 54' extending laterally outwardly toward the other support member, generally parallel to the equalizer beam 42 but spaced above it. As shown in FIG. 5, the arm portions 54' have curved, downwardly-facing bearing surfaces 56' engageable by respective ends of the tail shaft 48. The arm portions 54' and bearing surfaces 56' are formed by slots 66 in the opposing faces of the blocks, each slot extending from the rear of the block forwardly toward the center of member 50' and then generally upwardly and forwardly. The upper edge of each slot 66 defines a generally downwardly-facing bearing surface 56' for a respective end of the tail shaft. The slots 66 are sufficiently wide to allow the ends of tail shaft 48 to pass through the slots 66 and engage the bearing surfaces 56'.

As discussed above, a retaining means generally indicated at 57' is preferably associated with each support member 50' for holding the ends of tail shaft in engagement with their respective bearing surfaces 56' when forces tending to separate tail shaft 48 from these bearing surfaces 56' are applied to the shaft 48. In the embodiment of FIGS. 4 and 5, retaining means 57' comprises a jam bolt 68 extending through each support block 50' into engagement with a respective end of tail shaft. The jam bolts 68 can be secured by means of lock nuts 70.

Operation

In the first embodiment, the support members 50 mounted on the equalizer beam 42 are positioned over the ends of tail shaft 48 with the ends of the tail shaft in engagement with the downwardly-facing bearing surfaces 56. The retainer bars 58 are then positioned below the tail shaft ends and the bolts 62 and nuts 64 tightened to clamp the ends of the tail shaft between bearing surfaces 56 and 60. With the tail shaft 48 thus secured, the pump unit 20 can be started. The in-service loads should keep the ends of tail shaft 48 bearing against bearing surfaces 56. However, should some force tend to cause the ends of tail shaft 48 to separate from bearing surfaces 56, the retainer bars 58 will maintain the engagement.

The equalizer beam is thus quickly and reliably connected with only a minimum of effort in the field. The load of the pumping unit 20 is transmitted in sequence through walking beam 26, bearing housing 46, a bearing, tail shaft 48, support members 50 and welds 52, to the equalizer beam 42 in simple direct fashion. The cyclic loading of bolts holding the tail shaft 48 is eliminated, thereby eliminating the criticality of properly installing and torquing these bolts.

In the second embodiment, the support members 50' mounted on equalizer beam 42 are positioned for enabling the ends of tail shaft 48 to slide into slots 66 to a point where they engage bearing surfaces 56'. The jam bolts 68 are then threaded through the support members 50' and into engagement with the ends of the tail shaft. The jam bolts can be secured by tightening lock nuts 70 against support members 50'. The in-service loads should keep the ends of the tail shaft against bearing surfaces 56'. However, should some force tend to cause the ends of tail shaft to separate from bearing surfaces 56', the jam bolts will maintain the engagement.

The equalizer beam is thus quickly and reliably connected to the walking beam with a minimum of effort in the field. The load on the pumping unit 20 is transmitted in sequence through the walking beam 26, bearing housing 46, a bearing, tail shaft 48, support members 50' and welds 52', to the equalizer beam 42 in simple and direct fashion. The cyclic loading of bolts holding the tail shaft 48 is eliminated, thereby eliminating the criticality of properly installing and torquing these bolts.

In either the first or second embodiment, the support members 50 or 50' are preferably installed on the equalizer beam in the factory, eliminating the problems and difficulties of properly assembling these components in the field.

There are various changes and modifications which may be made to this invention as would be apparent to those skilled in the art. However, any of these changes or modifications are included in the teachings of this disclosure, and it is intended that this invention be limited only by the scope of the claims appended hereto.

What is claimed is:

1. An oil well pumping unit of the type comprising a walking beam having a tail shaft rotatably mounted on one end of the beam generally perpendicular to the longitudinal axis of the beam, an equalizer beam extending generally parallel to the tail shaft, and means for connecting the equalizer beam and the tail shaft characterized in that said means comprises a pair of support members spaced from one another lengthwise of the equalizer beam and being rigidly secured to the equalizer beam, each support member having an integral arm extending laterally outwardly from the support member toward the other support member generally parallel to the equalizer beam and spaced above the beam, said arms having curved, generally downwardly-facing bearing surfaces adapted for engagement by the respective ends of the tail shaft, and retainer means associated with each support member for holding a respective end of the tail shaft in engagement with said downwardly-facing bearing surface when forces tending to separate the shaft from the bearing surface are applied to the shaft.

2. An oil well pumping unit as set forth in claim 1 wherein the retainer means associated with each support member comprises a retainer member adapted to be positioned below the respective end of the tail shaft, and fastener means for drawing the retainer member up against a respective end of the tail shaft to thereby clamp the tail shaft against said downwardly-facing bearing surface.

3. An oil well pumping unit as set forth in claim 2 wherein said support members are welded to the equalizer beam.

4. An oil well pumping unit as set forth in claim 2 wherein said downwardly-facing bearing surface on each arm is curved on an arc of from about 60° to about 180°.

5. An oil well pumping unit as set forth in claim 4 wherein said downwardly facing bearing surface and each arm is curved on a arc of about 105°.

6. An oil well pumping unit as set forth in claim 2 wherein said upwardly-facing bearing surface on each retainer member is curved on an arc of from 60°–180°.

7. An oil well pumping unit as set forth in claim 6 wherein said upwardly-facing bearing surface on each retainer member is curved on an arc of about 90°.

8. An oil well pumping unit as set forth in claim 1 wherein each support member is generally C-shaped. with upper and lower arms and an opening therebetween, the upper arms of each support member having said downwardly-facing bearing surface, the openings in the support members facing each other to form a space for the tail shaft to pass under the upper arms and engage the downwardly-facing bearing surface on the upper arms.

9. An oil well pumping unit as set forth in claim 8 wherein said support members are welded to the equalizer beam.

10. An oil well pumping unit as set forth in claim 9 wherein said retainer means associated with each support member comprises a retainer bar adapted to be positioned above the lower arm of the support member and below a respective end of the tail shaft, said retainer bar having a curved upwardly-facing bearing surface adapted for engagement by a respective end of said tail shaft, and fastener means for drawing the retainer bar up against a respective end of the tail shaft thereby to clamp the tail shaft between said upwardly and downwardlyfacing bearing surfaces.

11. An oil well pumping unit as set forth in claim 1 wherein said support members have opposing faces, each of the opposing faces having a slot therein extending from the rear of the support member forwardly and upwardly, the upper edge of each slot forming said generally downwardly-facing bearing surface.

12. An oil well pumping unit of the type comprising a walking beam having a tail shaft rotatably mounted on one end of the beam generally perpendicular to the longitudinal axis of the beam, an equalizer beam extending generally parallel to the tail shaft, and means for connecting the equalizer beam and the tail shaft characterized in that said means comprises a pair of support members spaced from one another lengthwise of the equalizer beam and being rigidly secured to the equalizer beam, said support members having opposing faces, each of the opposing faces having a slot therein extending from the rear of the support member forwardly and upwardly, the slot defining an integral arm extending laterally outwardly from the support member toward the other support member generally parallel to the equalizer beam and spaced above the beam, the arm having a curved, generally downwardly-facing bearing surface adapted for engagement by the respective end of the tail shaft, and retainer means associated with each support member for holding a respective end of the tail shaft in engagement with said downwardly-facing bearing surface when forces tending to separate the shaft from the bearing surface are applied to the shaft, said retainer means comprising jam bolts extending through the support members in position to engage the ends of the tail shaft when the tail shaft is engaged by the bearing surfaces.

13. A connection between an equalizer beam and a tail shaft rotatably mounted near an end of a walking beam in an oil well pumping unit, the connection comprising:

a pair of support members spaced from one another lengthwise of the equalizer beam and being rigidly secured to the equalizer beam, each support member having a integral arm extending laterally outwardly from the support member toward the other support member, generally parallel to the equalizer beam and spaced above the beam, said arms having curved, generally downwardlyfacing bearing surfaces adapted for engagement by the respective ends of the tail shaft, and retainer means associated with each support member for holding a respective end of the tail shaft in engagement with said downwardly-facing bearing surface when forces tending to separate the shaft from the bearing surface are applied to the shaft.

14. A connection as set forth in claim 13 wherein the retainer means associated with each support member comprises a retainer member adapted to be positioned below the respective end of the tail shaft, and fastener means for drawing the retainer member up against a respective end of the tail shaft to thereby clamp the tail shaft against said downwardly-facing bearing surface.

15. A connection as set forth in claim 14 wherein said support members are welded to the equalizer beam.

16. A connection as set forth in claim 14 wherein said downwardly-facing bearing surface on each arm is curved on an arc of from about 60° to about 180°.

17. A connection as set forth in claim 16 wherein said downwardly facing bearing surface and each arm is curved on a arc of about 105°.

18. A connection as set forth in claim 14 wherein said upwardly-facing bearing surface on each retainer member is curved on an arc of from 60°–180°.

19. A connection as set forth in claim 18 wherein said upwardly-facing bearing surface on each retainer member is curved on an arc of about 90°.

20. A connection as set forth in claim wherein each support member is generally C-shaped, with upper and lower arms and an opening therebetween, the upper arms of each support member having said downwardly-facing bearing surface, the openings in the support members facing each other to form a space for the tail shaft to pass under the upper arms and engage the downwardly-facing bearing surface on the upper arms.

21. A connection as set forth in claim 20 wherein said support members are welded to the equalizer beam.

22. A connection as set forth in claim 21 wherein said retainer means associated with each support member comprises a retainer bar adapted to be positioned above the lower arm of the support member and below a respective end of the tail shaft, said retainer bar having a curved upwardly-facing bearing surface adapted for engagement by a respective end of said tail shaft, and fastener means for drawing the retainer bar up against a respective end of the tail shaft thereby to clamp the tail shaft between said upwardly and downwardlyfacing bearing surfaces.

23. A connection as set forth in claim 13 wherein said support members have opposing faces, each of the opposing faces having a slot therein extending from the rear of the support member forwardly and upwardly, the upper edge of each slot forming said generally downwardly-facing bearing surface.

24. A connection between an equalizer beam and a tail shaft rotatably mounted near an end of a walking beam in an oil well pumping unit, the connection comprising: a pair of support members spaced from one another lengthwise of the equalizer beam and being rigidly secured to the equalizer beam, said support members having opposing faces, each of the opposing faces having a slot therein extending from the rear of the support member forwardly and upwardly, the slot defining an integral arm extending laterally outwardly from the support member toward the other support member generally parallel to the equalizer beam and spaced above the beam, the arm having a curved, generally downwardly-facing bearing surface adapted for engagement by the respective ends of the tail shaft, and retainer means associated with each support member for holding a respective end of the tail shaft in engagement with said downwardly-facing bearing surface when forces tending to separate the shaft from the bearing surface are applied to the shaft, said retainer means comprising jam bolts extending through the support members in position to engage the ends of the tail shaft when the tail shaft is in engagement with said bearing surfaces.

* * * * *